(12) United States Patent
Niaura et al.

(10) Patent No.: US 7,380,799 B2
(45) Date of Patent: Jun. 3, 2008

(54) ADJUSTABLE VEHICLE SUSPENSION SYSTEM WITH ADJUSTABLE-RATE AIR SPRING

(75) Inventors: William S. Niaura, Akron, OH (US); Dean R. Tener, Akron, OH (US); Christopher R. Monroe, Avon, IN (US); David J. Mickler, McCordsville, IN (US); Graham R. Brookes, Carmel, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 497 days.

(21) Appl. No.: 10/982,106

(22) Filed: Nov. 5, 2004

(65) Prior Publication Data

US 2005/0093265 A1 May 5, 2005

(51) Int. Cl.
*F16F 9/04* (2006.01)
*B60G 17/04* (2006.01)

(52) U.S. Cl. .................. 280/5.519; 280/124.157; 280/124.159; 267/64.21; 267/64.24

(58) Field of Classification Search ................. 280/124.157–124.162, 5.512, 5.514, 5.515, 280/5.519; 267/64.21, 64.23, 64.24, 64.27, 267/64.28
See application file for complete search history.

(56) References Cited

U.S. PATENT DOCUMENTS

| | | | |
|---|---|---|---|
| 2,977,134 A | 3/1961 | Helling | |
| 3,078,085 A * | 2/1963 | Bank | 267/64.24 |
| 3,141,659 A | 7/1964 | Lyon, Jr. | |
| 3,666,286 A | 5/1972 | Engfer | |
| 3,736,003 A | 5/1973 | Ono | |
| 4,332,397 A | 6/1982 | Steger | |
| 4,335,901 A | 6/1982 | Gladish | |
| 4,391,452 A | 7/1983 | Ohmori | |
| 4,493,481 A * | 1/1985 | Merkle | 267/64.27 |
| 4,650,166 A * | 3/1987 | Warmuth | 267/64.27 |
| 4,666,135 A * | 5/1987 | Buma et al. | 267/64.21 |
| 4,669,750 A | 6/1987 | Tanaka et al. | |
| 4,673,193 A | 6/1987 | Kobayashi et al. | |
| 4,688,774 A | 8/1987 | Warmuth | |
| 4,693,493 A | 9/1987 | Ikemoto et al. | |
| 4,712,776 A | 12/1987 | Geno et al. | |
| 4,778,198 A | 10/1988 | Gold | |
| 4,826,141 A | 5/1989 | Buma et al. | |
| 4,826,204 A | 5/1989 | Cameron | |
| 4,883,288 A | 11/1989 | Finn et al. | |
| 4,911,416 A | 3/1990 | Warmuth, II | |
| 4,961,594 A | 10/1990 | Pees | |
| 4,988,082 A | 1/1991 | Pees | |

(Continued)

*Primary Examiner*—Ruth Ilan
(74) *Attorney, Agent, or Firm*—Fay, Sharpe, Fagan, Minnich & McKee, LLP; Thomas R. Kingsbury

(57) ABSTRACT

An adjustable vehicle suspension system includes a plurality of damping members and an air spring operatively associated with each of the damping members. The suspension system also includes a compressed air source, a valve assembly, and a controller. The compressed air source is in fluid communication with each of the air springs. The valve assembly is operatively disposed between the compressed air source and each of the air springs. The controller is operatively associated with the valve assembly for selective activation thereof. A user can selectively adjust one of a damping rate of the damping members, a spring rate of the air springs, and a ride height of the air springs, such as by using a control panel. A method is also disclosed.

22 Claims, 8 Drawing Sheets

U.S. PATENT DOCUMENTS

| | | | |
|---|---|---|---|
| 5,042,782 A | 8/1991 | Mintgen | |
| 5,159,554 A * | 10/1992 | Buma et al. | 701/37 |
| 5,161,817 A | 11/1992 | Daum et al. | |
| 5,180,144 A | 1/1993 | Hellyer et al. | |
| 5,184,841 A | 2/1993 | Pischke et al. | |
| 5,346,246 A | 9/1994 | Lander et al. | |
| 5,374,077 A | 12/1994 | Penzotti et al. | |
| 5,518,225 A * | 5/1996 | Gubitz | 267/64.24 |
| 5,584,497 A | 12/1996 | Lander et al. | |
| 5,765,115 A | 6/1998 | Ivan | |
| 5,794,924 A | 8/1998 | Stolpp | |
| 6,305,673 B1 | 10/2001 | Delorenzis et al. | |
| 6,398,198 B1 | 6/2002 | Okamoto | |
| 6,454,248 B2 * | 9/2002 | Pradel | 267/64.24 |
| 6,471,196 B2 | 10/2002 | Stiller | |
| 6,581,918 B2 | 6/2003 | Voelkel | |
| 6,607,186 B2 | 8/2003 | Voelkel | |
| 6,923,433 B2 * | 8/2005 | Gross et al. | 267/64.11 |
| 2002/0070523 A1 | 6/2002 | Roemer et al. | |
| 2002/0079626 A1 | 6/2002 | Grotendorst et al. | |
| 2002/0113347 A1 | 8/2002 | Robbins | |
| 2003/0067103 A1 | 4/2003 | Easter | |

* cited by examiner

ADJUSTABLE VEHICLE SUSPENSION SYSTEM WITH ADJUSTABLE-RATE AIR SPRING

BACKGROUND

The present invention broadly relates to the art of vehicle suspension systems and, more particularly, to a suspension system in which the spring rate, damping rate and ride height are adjustable to vary performance characteristics of an associated vehicle.

Embodiments of the present system find particular application for use in association with passenger vehicles, such as performance or sports-type coupes, for example. It will be appreciated, however, that the same or other embodiments are equally applicable for use in association with any other suitable types of vehicles, such as pick-up trucks, for example.

Suspension systems for vehicles are generally well known and commonly used. Typically, vehicles are originally equipped with a suspension system that balances two or more characteristics, such as ride comfort and road handling performance, for example. The suspension system of a vehicle is generally designed to emphasize some of these characteristics more than others, depending upon the style of the vehicle and the market that it is directed to. For example, a large sedan might have a soft suspension system that emphasizes ride comfort, whereas a sports car would likely have a relatively stiff suspension that prioritizes performance over ride comfort. In either case, however, the original suspension system of the vehicle still often remains a compromise between performance and ride comfort.

Given the balanced performance that is typically provided by the original suspension system of a vehicle, performance-oriented components are available that can be used to replace various parts or portions of the original suspension system to alter the handling characteristics of the vehicle. However, there are numerous problems associated with altering the performance of a vehicle in this manner. One problem is that different parts and components are selected depending upon the desired change in the level of performance. That is, different parts would be selected to upgrade the suspension system for increased performance on the road than would be selected for use of the vehicle on a race track, for example. Outfitting a vehicle with a suspension system that is well suited for the race track would likely give an undesirably firm or rough ride during an everyday commute. But, outfitting a vehicle with a suspension system that simply increases the handling characteristics of the vehicle over that of the original suspension will often provide insufficient performance when used on a race track. As such, modified suspension systems are often still a compromise between various levels of performance.

Another disadvantage of modifying the original suspension system of a vehicle by installing various performance-oriented components is that such modifications are time consuming and can be difficult for those without sufficient skill, knowledge and/or equipment. Furthermore, it is typically not practical to regularly switch between one set of components for use on the track and a different set of components for everyday driving. This is due, at least in part, to the time and effort required for such modifications.

Yet another disadvantage is that it is difficult to achieve optimum performance of a modified suspension system that is assembled using parts and components from various companies and manufacturers. Typically, there is little assurance of compatibility of these different components. Additionally, the replacement of some components without replacing others, and/or using a combination of unmatched or otherwise incompatible parts can result in a suspension system that does not perform as desired.

What's more, suspension systems provided as original equipment on vehicles typically are designed to deliver the same level of ride quality regardless of road conditions. That is, the original suspension system of a vehicle, such as a large sedan, for example, typically endeavors to provide the same ride and performance on smooth, straight highways as on rougher, winding country roads, for example. As such, the springs of original systems typically provide a relatively consistent spring rate through the entire stroke of the associated strut, damping member or shock absorber. One disadvantage of such springs is the inherent compromise of ride quality and performance, as discussed above. Another disadvantage is that such springs are not suitably adapted to provide selectively adjustable spring rates. As such, it is generally necessary to physically switch out the springs and replace them with other springs having a different spring rate. The disadvantages of having to switch out components are detailed above, i.e., skill, knowledge, equipment, etc.

Other springs that have a variable spring rate, which increases and decreases as the spring is displaced, are also well known and commonly used in suspension systems of vehicles. However, the spring rate of such springs is not actually adjustable. Rather, the spring rate of the spring gradually increases, due to the construction of the spring, as the same is compressed. Oppositely, the spring rate gradually decreases as the spring returns to its original height. Typically, the appropriate spring rate for the vehicle is selected for use at the intended height of the vehicle and is relatively constant throughout the normal range of travel or stroke of the associated damping members or struts. As the spring approaches the bottom of the stroke of the associated damper, the spring rate rapidly increases over a short distance to avoid or minimize the bottoming out of the suspension and the corresponding impact to the passengers of the vehicle. As such, changing the ride height of a vehicle typically does not significantly change the spring rate of the spring. In fact, in most applications to date, such a significant change in spring rate would be largely undesirable. As such, changing out the spring, as mentioned above, remains the only practical way to adjust the spring rate of known suspension systems.

Other known suspension systems are adapted, such as by using air springs, for example, to permit selective adjustment of the ride height of the associated vehicle. In addition to providing adjustment to the ride height of the vehicle, these systems are commonly used to automatically level the vehicle during dynamic operation thereof. While such features are well known and commonly used, these systems have certain problems and/or disadvantages that limit the utility of the same. One problem that has historically been associated with such systems is that forces on the struts or dampers, such as stiction and friction due to side loading, for example, cause the leveling to be inexact, such as by causing the system to undershoot or overshoot the desired suspension level. This, of course, is disadvantageous because repeated leveling operations are often required to level the vehicle as desired. What's more, these systems can also attempt to level the vehicle under certain conditions, such as when a vehicle is traveling along a curve, for example, that could result in an improperly leveled vehicle.

SUMMARY

A suspension system in accordance with one embodiment of the present invention is provided and includes a plurality of damping members and an air spring operatively associated with each of the damping members. The suspension system also includes a compressed air source, a valve assembly, and a controller. The compressed air source is in fluid communication with each of the air springs. The valve assembly is operatively disposed between the compressed air source and each of the air springs. The controller is operatively associated with the valve assembly for selective activation thereof. A user can selectively adjust one of a damping rate of the damping members, a spring rate of the air springs, and a ride height of the air springs.

An adjustable suspension system in accordance with another embodiment of the present invention is provided and includes a damping member having a variable damping rate and an air spring assembly operatively associated with the damping member. The air spring assembly has a variable spring rate and a variable spring height. A first actuator is operatively associated with the damping member for varying the damping rate thereof. A second actuator is operatively associated with the air spring assembly for varying at least one of the spring rate and the spring height thereof. A controller is in communication with at least one of the first and second actuators and is operative to selectively actuate at least one of the first and second actuators. Such actuation is to adjust at least one of the damping member and the air spring assembly between a first performance mode in which the damping member has a first damping rate and the air spring assembly has a first spring rate and a first spring height, and a second performance mode in which the damping member has a second damping rate and the air spring has at least one of a second spring rate and a second spring height.

An air spring in accordance with one embodiment of the present invention is provided and includes a first end member having a peripheral wall and a second end member spaced from the first end member. A flexible sleeve is secured between the first end member and the second end member at least partially forming a chamber therebetween. The air spring is selectively operable at plurality of predetermined nominal operating heights with each of the nominal operating heights having a corresponding nominal spring rate.

A method in accordance with the present invention of adjusting between performance modes of a suspension system of a vehicle is provided and includes a step of providing a damping member having a variable damping rate and a first actuator operatively associated with the damping member for varying the damping rate. Another step includes installing the damping member and the first actuator on the vehicle. Additional steps include providing an air spring assembly and a second actuator and installing the air spring assembly on the vehicle in operative association with the damping member and installing the second actuator on the vehicle in operative association with the air spring assembly. The air spring assembly has a variable spring rate and a variable spring height. Further steps include providing a controller adapted to selectively actuate at least one of the first and second actuators and installing the controller on the vehicle. Still another step includes actuating at least one of the first and second actuators to adjust the damping member and the air spring assembly between a first performance mode in which the damping member has a first damping rate and the air spring assembly has a first spring rate and a first spring height, and a second performance mode in which the damping member has a second damping rate and the air spring assembly has at least one of a second spring rate and a second spring height.

Additionally, a suspension system in accordance with an embodiment of the present invention for use in association with a vehicle having a body and a plurality of wheels is provided and includes a plurality of damping members each disposed between the body and a different one of the wheels of the vehicle. The suspension system also includes an air spring supported on each of the damping members. Each of the air springs includes a first end member, a second end member in spaced relation to the first end member, and a flexible sleeve secured therebetween forming an air spring chamber. The suspension system also includes a valve assembly, a compressed air source, and a controller. The valve assembly includes a plurality of valve bodies and at least one actuator operatively associated with each of the valve bodies. The compressed air source is in fluid communication with each of the air springs through the passages of the valve assembly. The controller is in electrical communication with the actuators of the valve assembly for selective activation thereof. A user can selectively adjust one of a damping rate of the damping members, a spring rate of the air springs, and a ride height of the air springs.

Furthermore, an air spring in accordance with an embodiment of the present invention is provided and includes first and second end members in spaced relation to one another. A flexible sleeve is secured between the first and second end members at least partially forming an air spring chamber therebetween. The air spring is selectively operable at a plurality of predetermined nominal operating heights each having an associated nominal spring rate.

DETAILED DESCRIPTION OF THE PREFERRED EMBODIMENT

Figure 1:
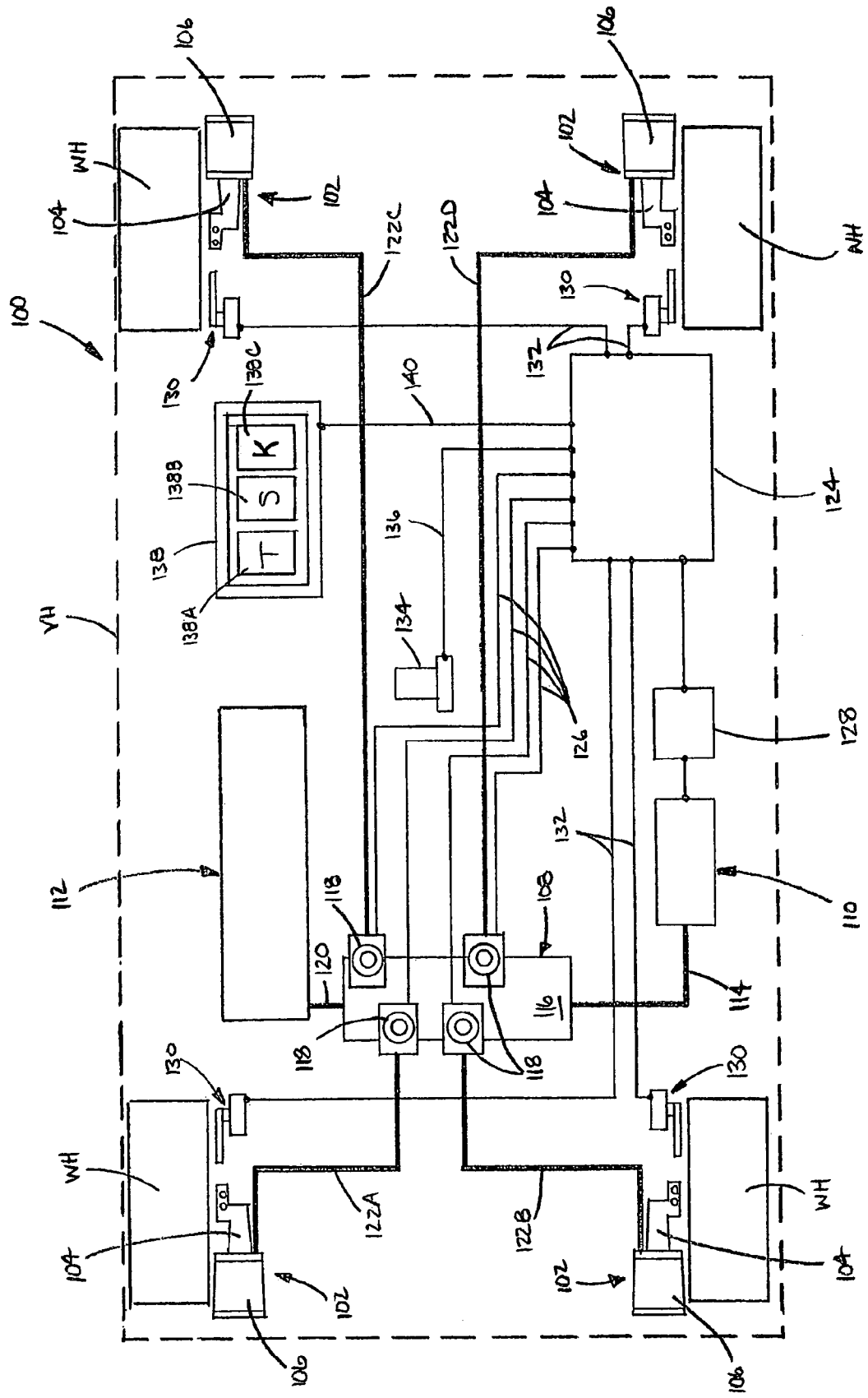
FIG. 1 is a schematic view of a one embodiment of a suspension system in accordance with the present invention.

Turning now to the drawings wherein the showings are for the purposes of illustrating preferred embodiments of the invention only, and not for the purposes of limiting the invention, FIG. 1 shows a suspension system 100 installed on a vehicle VH having wheels WH. The suspension system includes a plurality of damper and air spring assemblies 102, each of which is supported between the body (not shown) of vehicle VH and a different one of the wheels WH. Each of the damper and air spring assemblies includes a damping member 104 and an air spring 106 supported on the damping member. Preferably, each damping member is supported on vehicle VH in a typical manner, and the associated air spring is supported on the damping member adjacent the body of the vehicle.

Suspension system 100 also includes a valve assembly 108 and a compressed air source, such as a compressor 110, for example. A primary reservoir 112 can optionally be included to store compressed air, depending upon the desired use and performance of the system. Compressor 110 delivers compressed air to valve assembly 108 through fluid line 114. An optional air dryer (not shown) can be included to reduce or eliminate moisture from the compressed air, as is well known in the art. Valve assembly 108 includes a valve block 116 that has plurality of passages (not shown) extending therethrough. Airflow through the passages is controlled by one or more valve bodies (not shown). Actuators, such as electric solenoids 118, for example, are operatively associated with the valve bodies to displace the same between open and closed positions, as is well known by those of skill in the art. Compressed air flows into and out of reservoir 112 along air line 120 that is in fluid communication with valve assembly 108. As such, compressed air from compressor 110 can flow through the passages of valve assembly 108 and into reservoir 112. Alternately, the compressed air from compressor 110 can be directed through valve assembly 108 and along air lines 122A, 122B, 122C and 122D extending from valve assembly 108 to air springs 106 of respective assemblies 102. In other modes of operation, compressed air can flow in either direction between the air springs and the primary reservoir by way of air lines 122.

The flow of compressed air through the passages of valve assembly 108 is controlled by the opening and closing of the valve bodies disposed along the passages. The valve bodies are controlled or displaced between open and closed positions by actuators 118. The actuators are in electrical communication with a suitable controller, such as electronic control unit (ECU) 124 through wires 126. As such, ECU 124 can selectively open and/or close any one or more of the valve bodies by respectively activating and/or de-activating associated ones of actuators 118. ECU 124 can optionally be used to activate and de-activate compressor 110, such as through a relay 128 or other suitable electrical component or system. System 100 can also include height sensors 130 of any suitable type or kind, such as are well known by those of skill in the art. In FIG. 1, height sensors 130 are shown as being disposed adjacent each wheel WH for relating the position of the body of the vehicle relative to the wheel. Height sensors 130 are in electrical communication with ECU 124 through wires 132. An accelerometer 134 can optionally be included, such as for use in association with systems that provide dynamic ride height adjustment, for example. Alternately, other arrangements, signals or calculations can be used in place of or in combination with accelerometer 134, such as a signal indicating that the brakes of the vehicle are being applied or a measurement of the relative steering wheel position, for example. Where an accelerometer is used, the same is preferably supported centrally on the vehicle, and is in electrical communication with the ECU 124, for example, through wire 136. Additionally, a control panel 138 is also provided and is in electrical communication with ECU 124 through wire 140. Preferably, control panel 138 is suitable for mounting within the passenger compartment of the vehicle. However, it will be appreciated that the control panel, if provided, can be mounted in any suitable place or manner on the vehicle. Furthermore, the control panel can be removably connected to the ECU in some applications.

In operation, preferred embodiments of a suspension system in accordance with the present invention can be adjusted between two or more performance modes. In one embodiment, system 100, shown in FIG. 1, can be adjusted between three performance modes. For convenience and ease of reading, these three modes of performance are broadly labeled "touring mode," "sport mode," and "track mode" and will be referred to by these labels throughout the discussion provided hereinafter. It will be appreciated, however, that the labels are not intended to be in anyway limiting, that a greater or lesser number of operating modes can be included, and that additional and/or alternate performance modes can be provided without exceeding the scope and intent of the present invention.

Preferably, system 100 can be adjusted or switched between the various modes of performance with only a few, simple actions or steps that preferably do not require the use of tools. For example, in one embodiment, control panel 138 provides for selection between the three modes of performance. Switching from one mode to another can be as simple as selecting a different mode on control panel 138, which can include any suitable selector arrangement, such as a switch (not shown) or a keypad (not shown), for example. As shown in FIG. 1, control panel 138 includes a membrane pad having membrane buttons 138A, 138B and 138C, respectively corresponding to the touring (T), sport (S) and track (K) performance modes.

As mentioned above, a suspension system in accordance with the present invention is adjustable between a plurality of performance modes, which each exhibit distinctly different performance characteristics during the dynamic operation of the associated vehicle. Furthermore, as also mentioned above, examples of various performance modes including touring mode (T), sport mode (S) and track mode (K) are discussed hereinafter in further detail. Once again, however, it will be appreciated that these modes of performance are only examples of suitable modes of performance, and that any number of other modes of performance can additionally and/or alternately be included, such as a "cargo mode" used when the vehicle is transporting heavy or oversized cargo, for example.

In this example of a touring mode, suspension 100 provides a performance level that is comparable to that of the original suspension. In this example of a touring mode, the ride height, spring rate of the air springs, and damping rate of the damping members each provide the balance between comfort and performance of the original suspension of the vehicle. A vehicle outfitted with a suspension system operating in one example of this mode generally handles with some understeer, similar to that of the vehicle in its original configuration.

In this example of a sport mode, suspension 100 provides a performance level having reduced body motion and sharpened steering response for more performance-oriented road driving. In this example of a sport mode, the ride height of the vehicle is lowered a predetermined amount from that of the height of a vehicle having an original suspension, such as by an amount of from about 5 percent to about 15 percent, and preferably an amount of about 10 percent. Additionally, in this example of a sport mode, the spring rate of the air springs is increased from that of the original suspension of the vehicle, such as an amount of from about 50 percent to about 70 percent, and preferably an amount of about 60 percent. Furthermore, in this example of a sport mode, the damping rate of the damping members is also increased relative to that of the damping members of the original suspension. A vehicle outfitted with a suspension system operating in one example of this mode generally handles with a mild understeer.

In this example of a track mode, suspension 100 provides a performance level that is tuned for autocross and track use and exhibits more responsive handling traits than that of the touring and sport modes and than that of the original suspension. In this example of a track mode, the ride height of the vehicle is reduced a predetermined amount from the ride height of the original suspension, such as an amount of from about 20 percent to about 30 percent, and preferably an amount of about 25 percent. Additionally, in this example of a track mode, the spring rate of the air springs is increased by a predetermined amount, such as by an amount of from about 80 percent to about 100 percent from that of the original spring rate, and preferably by an amount of about 90 percent from that of the original spring rate. Furthermore, in this example of a track mode, the damping rate is increased over the level of damping in original suspension. A vehicle outfitted with a suspension system operating in one example of this mode generally handles in a neutral manner. That is, the vehicle generally handles without significant understeer or oversteer in this mode.

Additionally, ECU 124 or another suitable component can optionally be used to provide active leveling of the vehicle during the dynamic operation thereof. That is, the suspension system can also adjust the ride height of the vehicle while the vehicle is in operation by monitoring the ride height and selectively increasing and/or decreasing the air volume in one or more of the air springs as desired. It will be appreciated, however, that the system will preferably attempt to maintain vehicle performance generally within the parameters of the selected performance mode. In operation, height sensors 130 disposed adjacent each wheel can be monitored by ECU 124, for example, and the appropriate action taken to level the vehicle. Accelerometer 134 can be used to determine when the vehicle is out of level due to the vehicle undergoing a predetermined level of acceleration, such as longitudinal acceleration due to braking or lateral acceleration as the vehicle travels through a curve along a roadway, for example. It is often found to be generally undesirable to level a vehicle during a period of which the same is undergoing significant acceleration, as this can undesirably result in a non-level condition once the acceleration ends. As such, accelerometer 134 can be used to avoid or minimize the occurrence of leveling operations during such periods of acceleration.

Figure 2:
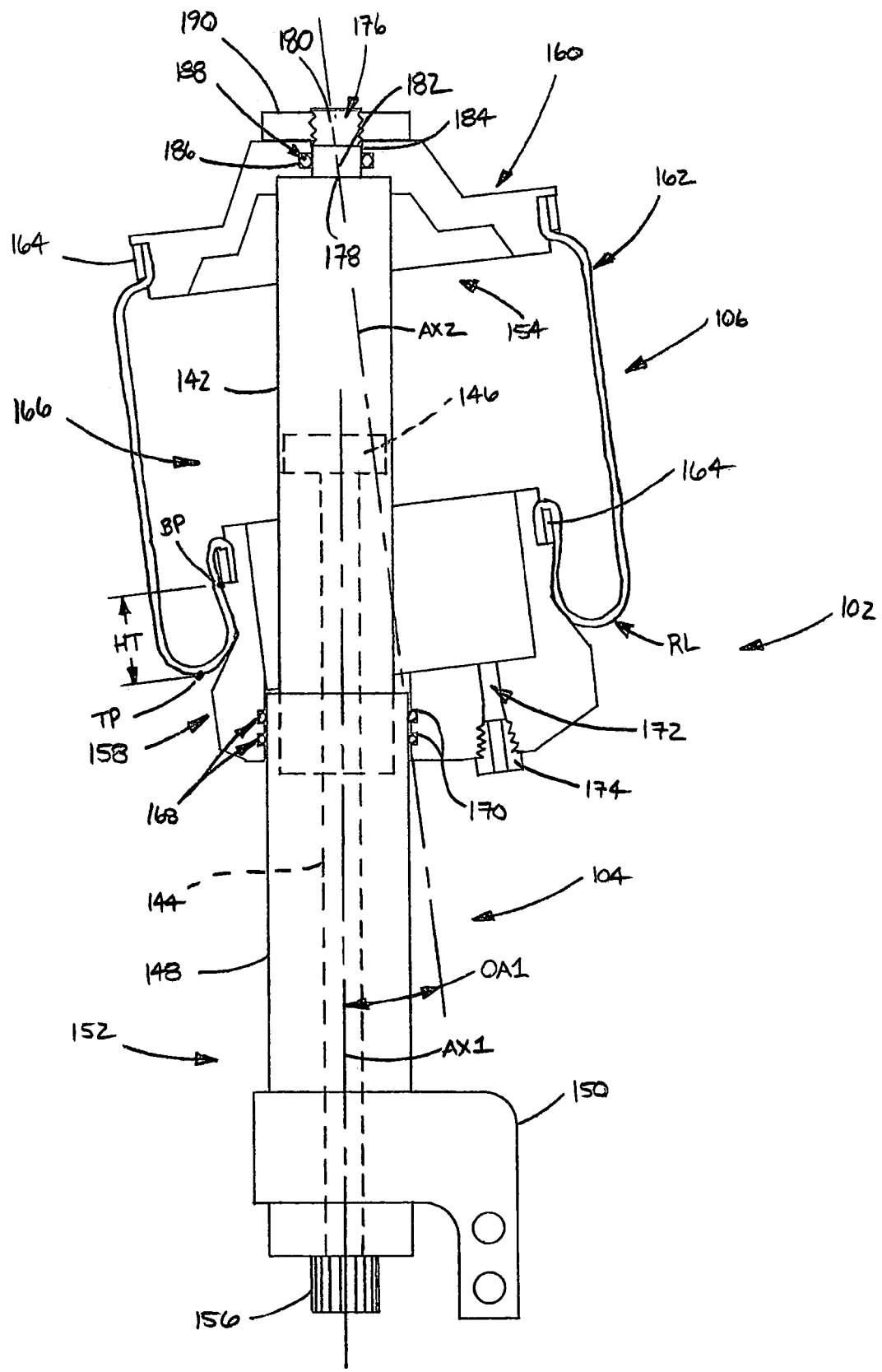
FIG. 2 is a side view, in partial cross-section, of one embodiment of a damping member and air spring assembly in accordance with the present invention.

One embodiment of a damper and air spring assembly that is suitably adapted for use in a system in accordance with the present invention is shown in FIG. 2 as assembly 102. Damper and air spring assembly 102 includes damping member 104 and air spring 106, as mentioned above. It will be appreciated that damping members are generally well known and are available in a variety of constructions. One suitable arrangement is an inverted monotube construction, such as that shown as damping member 104 in FIG. 2, for example.

Damping member 104 includes an elongated, cylindrical body 142 and a damping rod 144 with a piston 146 received within body 142. The body and damping rod are received in an inverted manner within a tubular housing 148, and a mounting bracket 150 is supported on a lower end 152 of the damping member. Preferably, bracket 150 engages a structural member (not shown) supporting wheel WH on vehicle VH, as is well known by those skilled in the art. At an upper end 154, damping member 104 engages, either directly or indirectly, one of air spring 106 and a structural component (not shown) of the body (not shown) of vehicle VH.

Preferably, damping member 104 is adapted to have an adjustable damping rate. It will be appreciated that adjustable-rate damping members are generally well known by those skilled in the art. One example of a suitable damping member, shown in FIG. 2 as damping member 104, includes a knob 156 on lower end 152. Knob 156 is preferably operatively associated with one or more passages (not shown) that extend through piston 146. As knob 156 is rotated, the passages (not shown) increase or decrease in size depending upon the direction of rotation of the knob. As the passages increase in size, less energy is dissipated by the damper and the damping rate is said to be decreased. Oppositely, as the size of the passages is decreased, a greater amount of energy is dissipated by the damper and the damping rate is said to be increased.

Air spring 106 includes a lower end member 158 supported on tubular housing 148, and an upper end member 160 supported on cylindrical body 142. A flexible sleeve 162 is attached in a fluid-tight manner, such as by using retaining bands 164, for example, between the upper and lower end members, and at least partially defines a spring chamber 166 therewithin. Lower end member 158 can be secured to housing 148 in any suitable manner, such as by welding, for example, and can optionally include one or more sealing members disposed between lower end member 158 and tubular housing 148 to form a fluid-tight seal therebetween. In FIG. 2, two sealing members, such as o-rings 168, are received in retaining grooves 170 of end member 158. A passage 172 in fluid communication with spring chamber 166 is provided through lower end member 158 and includes a fitting, such as threaded fitting 174, for example, for fluidically interconnecting an air line 122 (FIG. 1) with passage 172.

Upper end member 160 of air spring 106 is shown in FIG. 2 as being secured to a post 176 extending from an end wall 178 of body 142. Post 176 has a threaded portion 180 and a non-threaded portion 182. The post extends through an opening (not numbered) in end member 160 formed by a side wall 184. A retaining groove 186 is provided in side wall 184 for receiving a sealing member, such as an o-ring 188, for example. The sealing member is sealingly positioned between the upper end member and the non-threaded portion of the post. A threaded fastener, such as a nut 190, for example, secures upper end member 160 to body 142.

Damping member 104 has an axis AX1 in FIG. 2, and air spring 106 has an axis AX2. It is apparent from FIG. 2 that these axes are angularly disposed or offset relative to one another, as indicated by offset angle OA1. Any suitable angle from about 2 degrees to about 18 degrees can be used depending upon the configuration of the components and other details of the particular application.

Additionally, a dimension HT is shown in FIG. 2 from a base point BP on the lower end member to a tangential point TP on the rolling lobe RL of the flexible sleeve. This dimension is shown to generally establish reference points for the later discussion of the height of the air spring. It is to be specifically understood, however, that any suitable reference heights could be used and that the present invention is in no way intended to be limited by the use of these particular reference points. Furthermore, it will be understood by those skilled in the art that tangential point TP is a dynamic reference point that moves as rolling lobe RL translates along flexible sleeve 162 due to the relative displacement of the end members.

Figure 3:
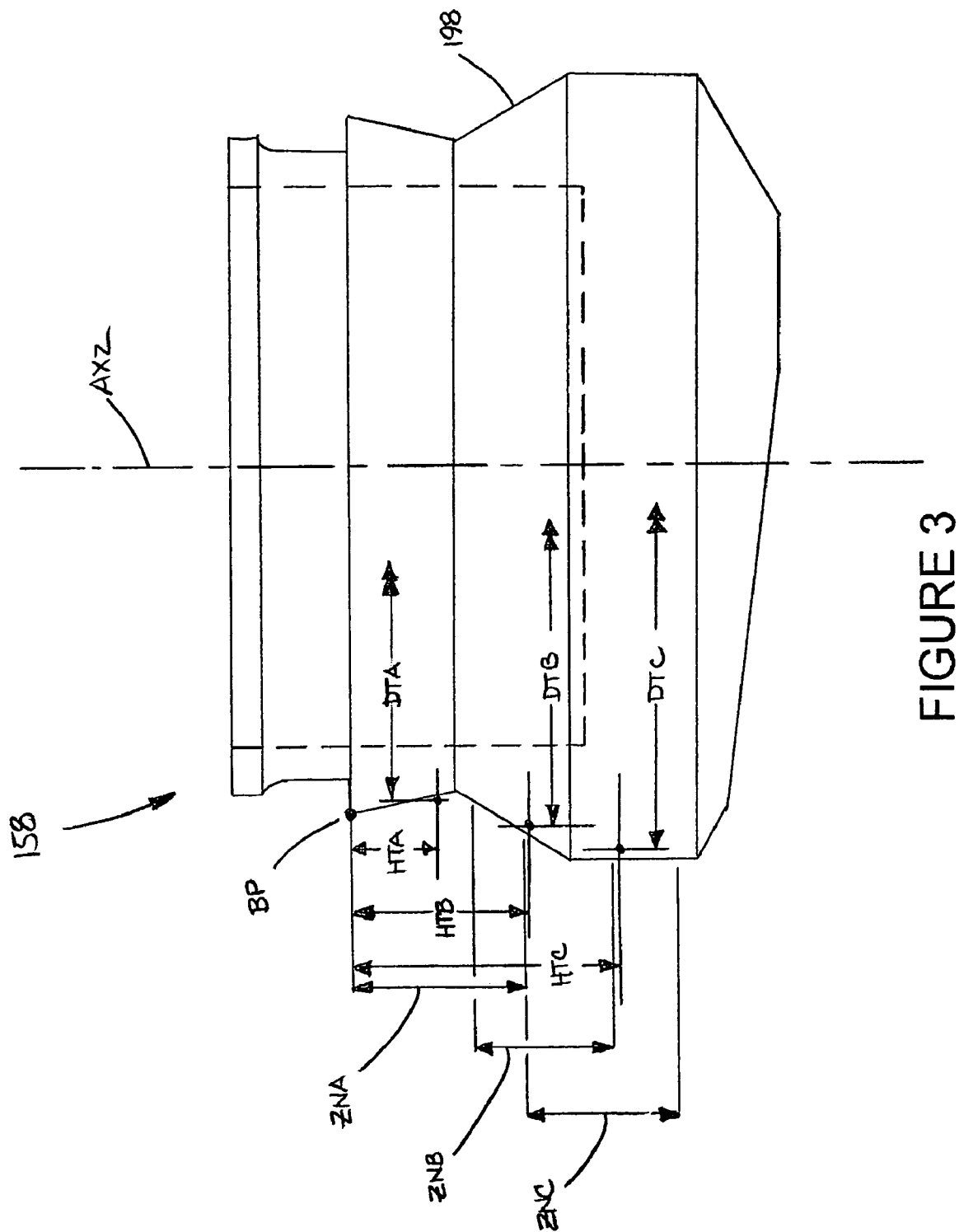
FIG. 3 is a side elevation view of the air spring piston from the air spring shown in FIG. 2.

Rolling lobe-type air springs are generally well known in the art, and commonly include a piston along which the flexible sleeve rolls. Broadly, lower end member 158 of air spring 106 acts as such a piston. However, lower end member 158 differs significantly from other known pistons, in that lower end member 158, as it is shown in FIG. 3, has a plurality of spring-rate zones ZNA, ZNB and ZNC formed thereon. It can be clearly observed from FIG. 3 that zones ZNA, ZNB and ZNC can, in certain arrangements, overlap one another to some degree. It will be appreciated, however, that in other arrangements, one or more of the zones could be separate and distinct from the others.

The overall profile of an outside wall 198 of lower end member 158 is preferably unique for each of zones ZNA, ZNB and ZNC. The profile for each zone can be formed by any suitable generatrix, including a generally axially extending line having linear and/or curvilinear portions. It will be appreciated that the generatrix of each zone will have a nominal diameter DTA, DTB and DTC respectively associated with the nominal height HTA, HTB and HTC of each zone. The calculation of the spring rate of air springs is generally well understood by those of skill in the art, and such calculation is commonly associated with a diameter of the piston of the air spring. As such, it will be appreciated that the spring rates of an air spring in accordance with the present invention are related to nominal diameters DTA, DTB and DTC of lower end member 158. Accordingly, those skilled in the art will recognize that a different nominal spring rate can be attained by positioning tangential point TP of flexible sleeve 162 at the different nominal heights HTA, HTB and HTC on lower end member 158 due to the different associated nominal diameters DTA, DTB and DTC. Said differently, air spring 106 will have a different nominal spring rate where tangential point TP is positioned at each of the different nominal heights HTA, HTB and HTC. The term nominal as used herein is intended to mean an approximate value, such as for a height or diameter dimension, a spring rate, or a damping rate, for example, that is assigned thereto for the purposes of a convenient designation. As such, a nominal value can be an average or mean value of an associated range of values, a design value, or another suitable target value, for example.

One practical result of such an air spring construction is that it is possible for suspension system 100 to switch between a plurality of spring rates simply by adding or venting a volume of air sufficient to position tangential point TP at a different nominal height. In one example of a suitable operation of suspension system 100, where membrane button 138A, which is associated with touring mode, is selected, ECU 124 in turn sufficiently fills air spring chamber 166 of each of air springs 106 such that tangential point TP of flexible sleeve 162 is located at about nominal height HTA. At nominal height HTA, lower end member 158 has a nominal diameter DTA which corresponds to a spring rate suitable for operation of the vehicle in touring mode. Where membrane button 138B, which is associated with sport mode, is selected, ECU 124 sufficiently fills air spring chamber 166 of each air spring such that tangential point TP of flexible sleeve 162 is located at about nominal height HTB. At nominal height HTB, lower end member 158 has a nominal diameter DTB which corresponds to a spring rate suitable for operation of the vehicle in sport mode. Where membrane button 138C, which is associated with track mode, is selected, ECU 124 sufficiently fills air spring chamber 166 of each air spring such that the tangential point TP of flexible sleeve 162 is located at about nominal height HTC. At nominal height HTC, lower end member 158 has a nominal diameter DTC which corresponds to a spring rate suitable for operation of the vehicle in track mode.

Figure 4:
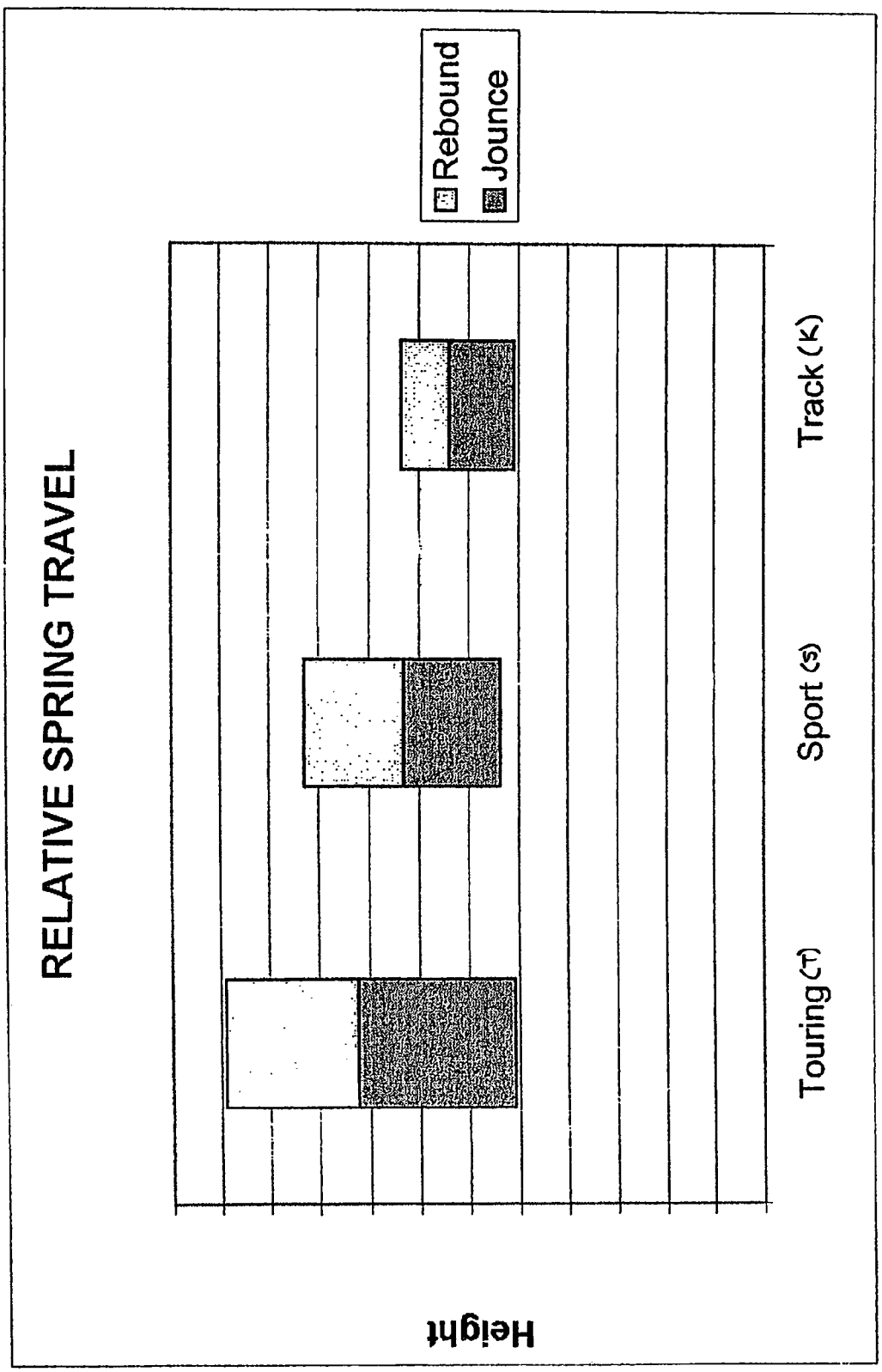
FIG. 4 is a graph illustrating relative air spring travel for three performance modes of a suspension system in accordance with the present invention.

FIG. 4 is a graph of overall height and overall travel of an air spring in accordance with the present invention in each of three performance modes, touring (T), sport (S) and track (K). From FIG. 4, it can be seen that in each of the performance modes the overall height of the air spring is reduced and that the overall travel of the spring, shown as rebound plus jounce, is also reduced as the air spring is changed from touring to sport to track modes. In one embodiment, the overall height of the air spring in touring mode is a distance of from about 200 mm to about 220 mm, and preferably a distance of about 210 mm, which is about the overall height of the original suspension. In sport mode, the overall height is reduced from that of the original suspension by a distance of from about 15 mm to about 35 mm, and preferably by a distance of about 25 mm. In track mode, the overall height is reduced from the height of the original suspension by a distance of from about 40 mm to about 60 mm, and preferably a distance of about 50 mm. Additionally, in one embodiment, the overall travel of the air spring is from about 140 mm to about 160 mm in touring mode. In sport mode, the overall travel is preferably from about 90 mm to about 110 mm. In track mode, the overall travel is preferably from about 50 mm to about 70 mm.

Figure 5:
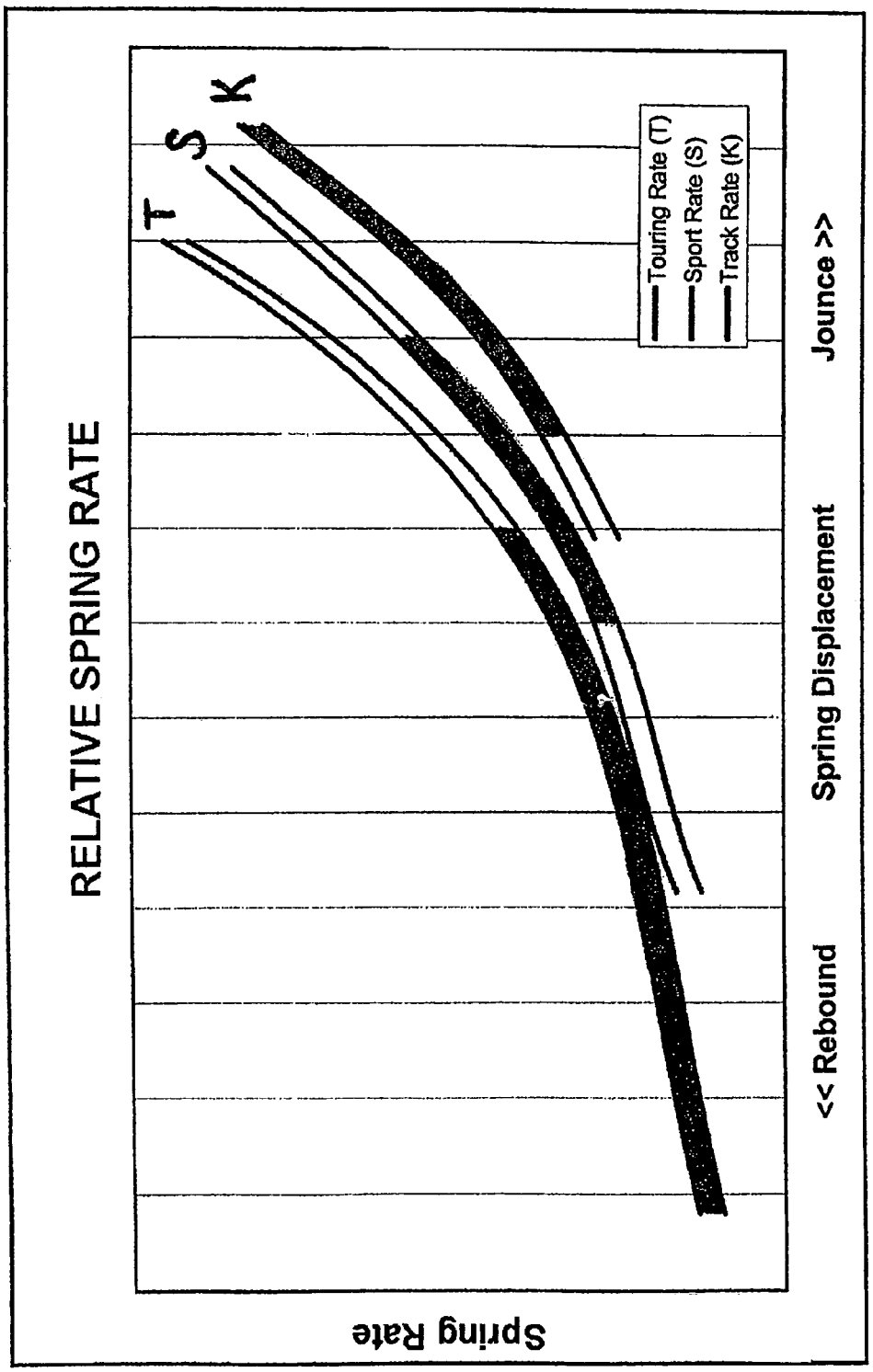
FIG. 5 is a graph illustrating relative spring rate for three performance modes of a suspension system in accordance with the present invention.

FIG. 5 is a graph of the relative spring rates of an air spring in accordance with the present invention in each of three performance modes, touring (T), sport (S) and track (K). It will be appreciated from FIG. 5 that lower end member 158 provides three different nominal spring rates in the three different zones ZNA, ZNB and ZNC corresponding respectively to touring, sport and track modes. Additionally, it can be observed that the rate at which the spring rate changes for each performance mode differs significantly. For example, the spring rate associated with the touring mode (T) has an elongated and rather slowly increasing slope. Whereas the spring rates associated with each of the sport mode (S) and the track mode (K) have a greater rate of change with displacement of the spring. That is, the sport mode and the track mode seem to get "stiffer" faster than the spring rate associated with the touring mode, with the spring rate associated with the track mode appearing to have the greatest rate of change.

One example of a suitable operational spring rate range for an air spring in accordance with the present invention operating in touring mode is from about 20 N/mm to about 90 N/mm. A suitable operational spring rate range for an air spring operating in sport mode is from about 50 N/mm to about 120 N/mm, and for an air spring operating in track mode is from about 80 N/mm to about 160 N/mm.

Figure 6:
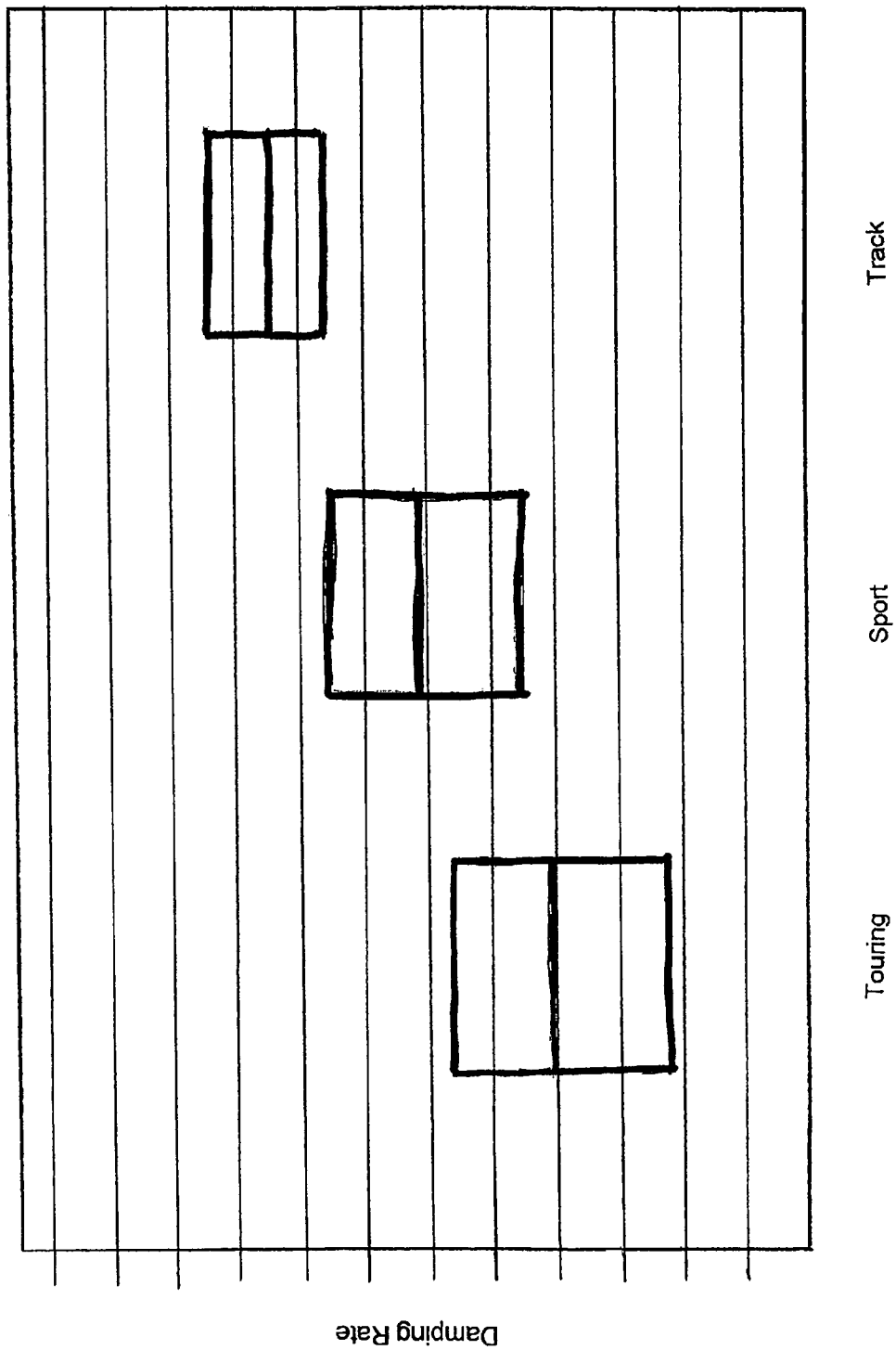
FIG. 6 is a graph illustrating relative damping rate for three performance modes of a suspension system in accordance with the present invention.

FIG. 6 is a graph of relative damping rates of the associated damping member for each of the three performance modes, touring (T), sport (S) and track (K). It can be observed from FIG. 6 that the damping rate of the associated damping member increases as the damping member is changed from touring to sport to track modes.

Figure 7:
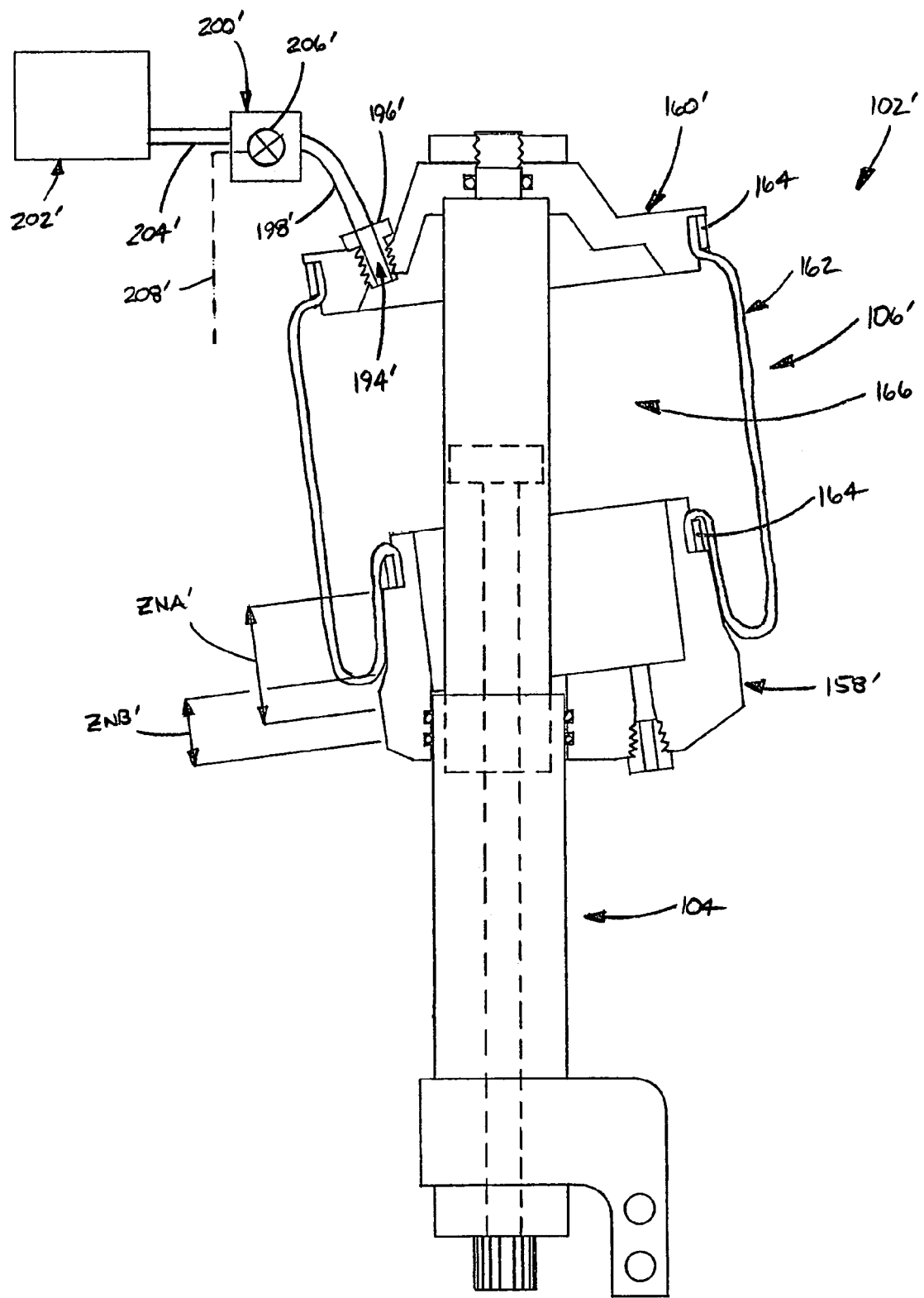
FIG. 7 is a side view, in partial cross-section, of another embodiment of a damping member and air spring assembly in accordance with the present invention.

Another embodiment of a damper and air spring assembly 102' in accordance with the present invention is shown in FIG. 7. It will be appreciated that assembly 102' is substantially similar to damper and air spring assembly 102 shown in FIG. 2 and discussed in detail hereinbefore. As such, like items are referred to using like item numbers, and modified and new components and/or features are referred to using primed (') item numbers. Items in one figure that have no counterpart in the other figure are distinctly pointed out and discussed where appropriate.

Damper and air spring assembly 102' includes a damping member 104 and an air spring 106' supported on the damping member as discussed above. Air spring 106' includes a lower end member 158', an upper end member 160' and a flexible sleeve 162 secured therebetween, such as by retaining bands 164, for example, forming an air spring chamber 166 therewithin.

Air spring 106' differs from air spring 106 in that lower end member 158' includes two zones ZNA' and ZNB', as shown in FIG. 7. As such, a third zone, such as zone ZNC of lower end member 158, for example, is not provided on lower end member 158'. Additionally, upper end member 160' has a passage formed therethrough, such as passage 194' that extends through threaded fitting 196', which threadably engages upper end member 160'. A fluid line 198' extends from fitting 196' and is in fluid communication with a valve 200'. A remote reservoir 202' is fluidically connected to valve 200' by a fluid line 204'. As such, remote reservoir 202' is in fluid communication with air spring chamber 166 of air spring 106', depending upon the condition of valve 200'. Valve 200' has an actuator 206' moving valve 200' between open and closed positions. It will be appreciated that actuator 206' can take any suitable form, such as a manually rotatable knob or an electric actuator, for example. Where actuator 206' is an electric actuator, the same can optionally be electrically connected to and controlled by ECU 124 of suspension system 100, if desired, such as via wire 208', for example. Items 194' to 206' have no corresponding counterpart in air spring 106 shown in FIG. 2.

It is well known by those skilled in the art that where a first air spring captures a greater volume but is otherwise identical, such as in construction and air pressure, for example, to a second air spring, the first air spring will typically have a lower or "softer" spring rate than that of the second air spring. This is primarily due to the fact that the first air spring has more air to be compressed than the second air spring. As discussed in detail above, one embodiment of suspension system 100 is operable in three different performance modes, touring (T), sport (S) and track (K). As shown in FIG. 7, lower end member 158' only provides two air spring zones ZNA' and ZNB'. However, an additional spring rate can be provided for each zone by selectively opening and closing valve 200' thereby causing the captured volume of air within remote reservoir 202' to become an active portion of the volume of air within air spring chamber 166. This increases the effective volume of air spring chamber 166, and reduces the spring rate of the air spring. As such, air spring 106' can produce an additional spring rate for each of spring rate zones ZNA' and ZNB' on lower end member 158'.

In another example of a suitable operation of suspension system 100 utilizing damper and air spring assemblies 102', where touring mode (T) is selected, ECU 124 causes air spring chamber 166 and remote reservoir 202' of each assembly 102' to be sufficiently filled such that the tangential point of each of the associated flexible sleeves is positioned at a nominal height on lower end member 158' in spring rate zone ZNA'. It will be appreciated that for compressor 110 and/or primary reservoir 112 to cause air to flow between chamber 166 and remote reservoir 202' that valve 200' is in an at least partially open condition, and that the valve can be either manually and/or automatically moved between open and closed conditions. As such, in touring mode (T), remote reservoir 202', which is operatively associated with an air spring 106', will be fluidically active providing a spring rate in air spring 106' that is suitable for performance of the suspension system in touring mode.

By closing valves 200', another spring rate can be provided by air springs 106' without any further adjustments to the air springs, such a spring rate is preferably suitable for operation of the air spring in sport mode. As such, where sport mode (S) is selected, actuators 206' are used to move valves 200' from the at least partially open condition to a closed condition. The tangential point of the associated flexible sleeves preferably remains at about the nominal height in spring rate zone ZNA' on lower end member 158' for each of the air springs. Thus, a second, different spring rate is provided by air springs 106'.

To switch from sport mode (S) to track mode (K), ECU 124 causes air spring cavities 166 of each of air springs 106' to be sufficiently filled such that the tangential point of the associated flexible sleeve is located at about a nominal height within spring rate zone ZNB' on lower end member 158' for each of the air springs. Thus, a third, different spring rate is also provided by air springs 106'. Additionally, it will be appreciated that a fourth, different spring rate could additionally be provided by opening valves 202' while the air springs are operating at a nominal height within spring rate zone ZNB'.

Figure 8:
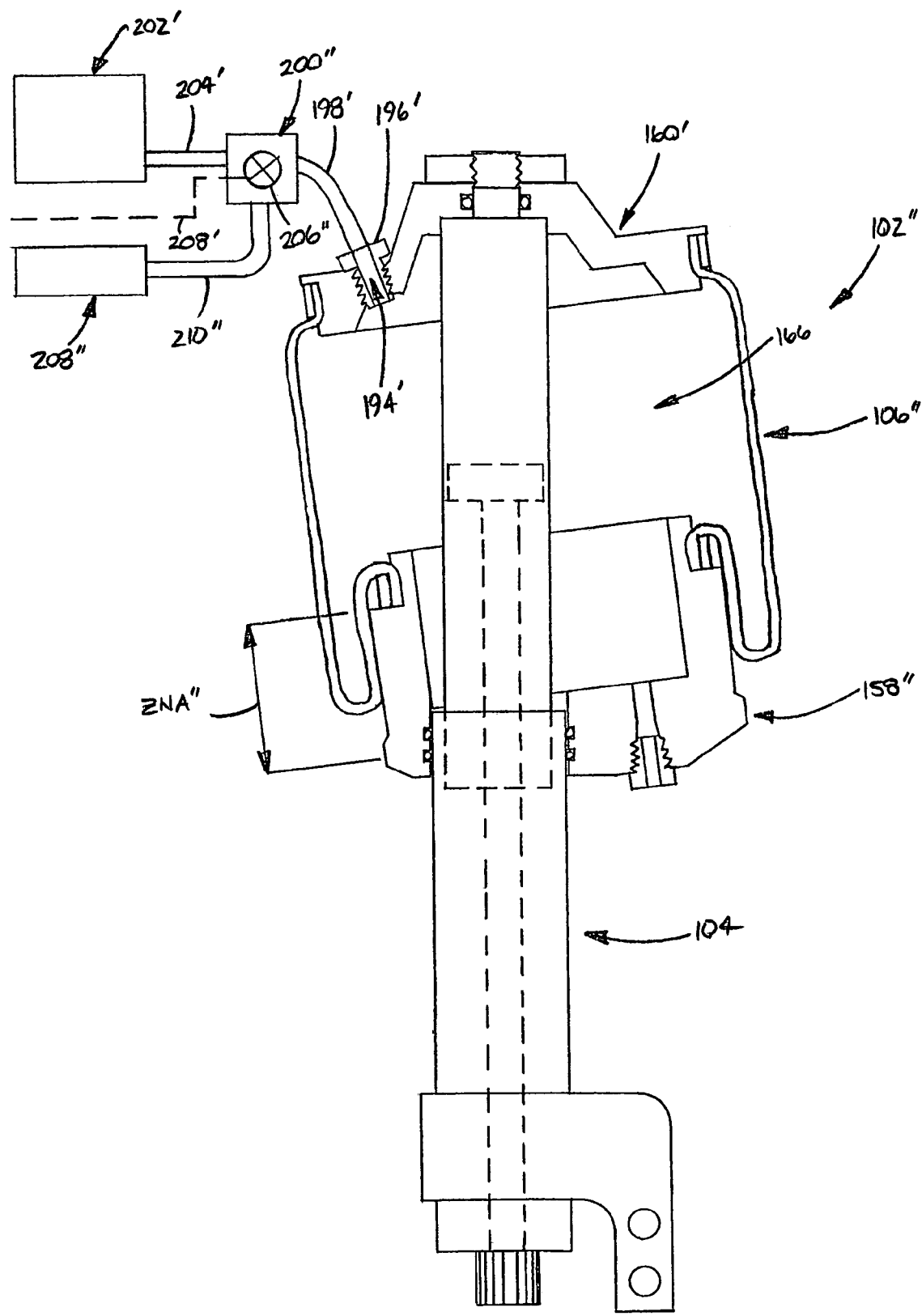
FIG. 8 is a side view, in partial cross-section, of a further embodiment of a damping member and air spring assembly in accordance with the present invention.

Another embodiment of a damper and air spring assembly 102" in accordance with the present invention is shown in FIG. 8. It will be appreciated that assembly 102" is substantially similar to damper and air spring assembly 102' shown in FIG. 7 and discussed in detail hereinbefore. As such, like items are referred to using like item numbers, and modified or new components and/or features are referred to using double primed (") item numbers. Items shown in one figure, but having no counterpart in the other figure, are distinctly pointed out and discussed where appropriate.

Damper and air spring assembly 102" includes a damping member 104 and an air spring 106" supported on the damping member as discussed above. Air spring 106" differs from air spring 106' in that lower end member 158" has only one spring rate zone ZNA" whereas lower end member 158' has two spring rate zones ZNA' and ZNB'. Additionally, air spring 106" includes a second remote reservoir 208" that is fluidically interconnected to a valve 200" through a fluid line 210". Air spring 106" also includes first remote reservoir 202' which is also fluidically interconnected to valve 200" through fluid line 204'. An actuator 206" on valve 200" is adapted to selectively permit flow into and out of reservoirs 202' and 208", either individually or in combination with one another to any desire extent.

As discussed above, one embodiment of suspension system 100 is operable in three different performance modes, touring (T), sport (S) and track (K). Utilizing remote reservoirs 202' and 208", air spring 106" can provide three associated spring rates by selectively opening and/or closing the remote reservoirs. In one example, to provide a suitable spring rate for a touring mode, valve 200" can be configured such that both remote reservoirs are in fluid communication with air spring chamber 166. Alternately, where remote reservoirs 202' and 208" are of different sizes, valve 200" can be configured such that only the larger of the two remote reservoirs is in fluid communication with the air spring chamber. To provide a suitable spring rate for a sport mode, valve 200" can be configured such that only one of the remote reservoirs is in fluid communication with the air spring chamber. Where the remote reservoirs are of different sizes, the smaller reservoir would preferably be used. To provide a suitable spring rate for a track mode, valve 200"

can be configured to fluidically isolate both remote reservoirs from the air spring chamber. As such, the spring rate for the track mode would be dictated by the profile of lower end member 158" within spring rate zone ZNA".

Preferably, suspension system 100 will be used to replace at least a portion of the original suspension system of the vehicle. As such, a commercial embodiment of system 100 can optionally include assorted brackets, fittings, fasteners, and other structural components that are known by those skilled in the art. For example, system 100 can also, optionally include a suitable tie bar (not shown) to replace the original tie bar, the system could recommend a suitable replacement for an original tie bar, or the system could utilize the existing, original tie bar. It will be appreciated that tie bars are generally well known by those skilled in the art, and that the foregoing is simply one example of an optional component of system 100.

It will be further appreciated that the foregoing discussion is directed to an embodiment optimized for use on a specific vehicle, which, in this case, is a SUBARU IMPREZA WRX. As such, various other components, such as brackets, fittings, fasteners and other components as discussed above, may be available for systems optimized for use in association with other vehicles. What's more, it is to be specifically understood that the specifics of any and/or all of the different performance modes can vary from vehicle to vehicle without departing from the principle of the present invention.

Furthermore, other systems in accordance with the present invention can optionally include a greater or lesser number of features and/or components for switching between the various performance modes, without departing from the principles of the present invention. For example, where the vehicle that an optimized suspension system is to be installed upon is an expensive, luxury sedan, the system could be adapted to automatically switch the system components between the various performance, whereas, a system optimized for a less expensive vehicle might have one or more components that are manually adjustable.

In other embodiments, switching from one mode of operation to another can also include the manual actuation of one or more knobs, switches, levers or other devices. For example, damping member 104 includes knob 156 for manually adjusting the damping rate thereof. As such, selection of a different operating mode preferably includes manual manipulation of the knob to different positions which alter the operating and/or performance characteristics of the damping member to conform with the mode of operation selected. Alternately, this manual operation could optionally be accomplished by use of a suitable actuator, such as an electric actuator, for example, that can be controlled by control panel 138 and/or ECU 124, for example.

While the invention has been described with reference to the preferred embodiment and considerable emphasis has been placed herein on the structures and structural interrelationships between the component parts of the embodiment disclosed, it will be appreciated that other embodiments of the invention can be made and that many changes can be made in the embodiment illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims and any equivalents thereof.

We claim:

1. An adjustable suspension system for securement between an associated sprung mass and an associated unsprung mass of an associated vehicle, said adjustable suspension system comprising:
    a damping member having a variable damping rate;
    an air spring assembly operatively associated with said damping member, said air spring assembly capable of operating at at least a first predetermined spring rate corresponding to a first nominal spring height of a first predetermined height range, a second predetermined spring rate corresponding to a second nominal spring height of a second predetermined height range and a third predetermined spring rate corresponding to a third nominal spring height of a third predetermined height range, said second spring rate being from about 50 percent to about 70 percent greater than said first spring rate with said second nominal spring height being about 5 percent to about 15 percent lower than said first nominal spring height, and said third spring rate being from about 80 percent to about 100 percent greater than said first spring rate with said third nominal spring height being from about 20 percent to about 30 percent lower than said first nominal spring height;
    a first actuator operatively associated with said damping member for varying said damping rate thereof;
    a second actuator operatively associated with said air spring assembly for selectively varying said air spring assembly between said first, second and third predetermined spring rates at a corresponding one of said first, second and third nominal spring heights; and,
    a controller in communication with at least one of said first and second actuators and operative to selectively actuate at least one of said first and second actuators to adjust at least one of said damping member and said air spring assembly between:
        a first performance mode in which said damping member has a first damping rate and said air spring assembly has approximately said first predetermined spring rate and approximately said first nominal spring height,
        a second performance mode in which said damping member has a second damping rate and said air spring assembly has approximately said second predetermined spring rate and approximately said second nominal spring height, and
        a third performance mode in which said damping member has a third damping rate and said air spring assembly has approximately said third predetermined spring rate and approximately said third nominal spring height.

2. An adjustable suspension system according to claim 1 further comprising a compressed air source in communication with said air spring and a valve assembly operatively disposed between said compressed air source and said air spring assembly, said valve assembly including said second actuator.

3. An adjustable suspension system according to claim 1 further comprising a control panel in operative communication with said controller for selectively switching between said first, second and third performance modes.

4. An adjustable suspension system according to claim 1, wherein said air spring assembly includes a first end member having a peripheral wall, a second end member in spaced relation to said first end member and a flexible sleeve secured between said first and second end members forming a chamber therebetween.

5. An adjustable suspension system according to claim 4, wherein said peripheral wall of said first end member has first, second and third spring rate zones disposed therealong and each of said spring rate zones is associated with a corresponding one of said first, second and third predetermined spring rates.

6. An adjustable suspension system according to claim 5, wherein said flexible sleeve forms a rolling lobe along said peripheral wall of said first end member, said lobe having a geometric reference point and said reference point being disposed within a different one of said spring rate zones for each of said first, second and third predetermined spring rates.

7. An adjustable suspension system according to claim 5, wherein said first, second and third spring rate zones respectively include said first, second and third nominal spring heights.

8. An adjustable suspension system according to claim 1, wherein said second damping rate is greater than said first damping rate and said third damping rate is greater than said second damping rate.

9. An adjustable suspension system according to claim 1, wherein said first actuator includes a manually adjustable knob operatively connected to said damping member and selectively adjustable between at least said first, second and third damping rates.

10. An air spring assembly capable of operating at at least three substantially-different nominal spring rates each corresponding to a different nominal spring height, said air spring assembly comprising:
a first end member having a central axis and a peripheral wall extending about said axis between opposing first and second ends, said first end member including first, second and third spring rate zones axially formed along said peripheral wall;
a second end member spaced from said first end member; and,
a flexible sleeve secured between said first end member and said second end member at least partially forming a chamber therebetween;
said first spring rate zone disposed toward said first end, and said first spring rate zone having a first nominal diameter disposed a first nominal distance from said first end such that operation of said air spring assembly in said first spring rate zone corresponds to a first nominal spring rate of said at least three substantially-different nominal spring rates at a first nominal spring height;
said second spring rate zone disposed adjacent said first spring rate zone in a direction opposite said first end, said second spring rate zone having a second nominal diameter disposed a second nominal distance from said first end, said second nominal distance being greater than said first nominal distance of said first spring rate zone, and said second nominal diameter being greater than said first nominal diameter such that operation of said air spring assembly in said second spring rate zone corresponds to a second nominal spring rate of said at least three substantially-different nominal spring rates that is greater than said first nominal spring rate and a second nominal spring height that is less than said first nominal spring height;
said third spring rate zone disposed adjacent said second spring rate zone in a direction opposite said first spring rate zone, said third spring rate zone having a third nominal diameter disposed at a third nominal distance from said first end, said third nominal distance being greater than said second nominal distance of said second spring rate zone, said third nominal diameter being greater than said second nominal diameter such that operation of said air spring assembly in said third spring rate zone corresponds to a third nominal spring rate of said at least three substantially-different nominal spring rates that is greater than said second nominal spring rate and a third nominal spring height that is less than said second nominal spring height;
whereby said nominal spring rate of said air spring assembly is adapted to be selectively increased from said first nominal spring rate to said second nominal spring rate by merely venting a volume of air from said air spring assembly and thereby lowering said nominal spring height from said first nominal spring height to said second nominal spring height, and selectively increased from said second nominal spring rate to said third nominal spring rate by merely venting a further volume of air from said air spring assembly and thereby lowering said nominal spring height from said second nominal spring height to said third nominal spring height.

11. An air spring according to claim 10, wherein said peripheral wall of said first end member is at least partially defined by a generatrix revolved about said axis.

12. An air spring according to claim 10, wherein said flexible sleeve has a rolling lobe formed thereon, said lobe having a geometric reference point disposed adjacent a different one of said nominal spring heights for each of said corresponding nominal spring rates.

13. An air spring assembly according to claim 10, wherein said spring rate within said first spring rate zone increases at a first rate of change upon axial compression of said air spring assembly, said spring rate within said second spring rate zone increases at a second rate of change upon axial compression of said air spring assembly, and said spring rate within said third spring rate zone increases at a third rate of change upon axial compression of said air spring assembly.

14. An air spring assembly according to claim 13, wherein each of said first, second and third rates of change are different from one another.

15. An air spring assembly according to claim 13, wherein said second rate of change is greater than said first rate of change and said third rate of change is greater than said second rate of change.

16. An air spring assembly according to claim 10, wherein each of said first and second end members includes a passage formed therethrough with said passages being coaxial to one another and suitable for receiving a portion of an associated damping member.

17. An air spring assembly according to claim 10, wherein an operational spring rate of said air spring assembly within said first spring rate zone is from about 20 N/mm to about 90 N/mm, an operational spring rate of said air spring assembly within said second spring rate zone is from about 50 N/mm to about 120 N/mm, and an operational spring rate of said air spring assembly within said third spring rate zone is from about 80 N/mm to about 160 N/mm.

18. An air spring assembly according to claim 10, wherein said second nominal spring rate is at least 50 percent greater than said first nominal spring rate, and said third nominal spring rate is at least 80 percent greater than said first nominal spring rate.

19. An air spring assembly according to claim 10, wherein said second nominal spring height is at least 5 percent less than said first nominal spring height, and said third nominal spring height is at least 20 percent less than said first nominal spring height.

20. A method of adjusting between performance modes of a suspension system of a vehicle, said method comprising steps of:
- a) providing a damping member having a variable damping rate and a first actuator operatively associated with said damping member for varying said damping rate, and installing said damping member and said first actuator on said vehicle;
- b) providing an air spring assembly and a second actuator, installing said air spring assembly on said vehicle in operative association with said damping member, and installing said second actuator on said vehicle in operative association with said air spring assembly, said air spring assembly capable of being;
  - b1) selectively lowered from a first nominal spring height corresponding to a first nominal spring rate to a second nominal spring height corresponding to a second nominal spring rate that is greater than said first nominal spring rate;
  - b2) selectively lowered from said second nominal spring height corresponding to said second nominal spring rate to a third nominal spring height corresponding to a third nominal spring rate that is greater than said second nominal spring rate;
  - b3) selectively raised from a third nominal spring height corresponding to said third nominal spring rate to said second nominal spring height corresponding to said second nominal spring rate that is less than said third nominal spring rate; and;
  - b4) selectively raised from a second nominal spring height corresponding to said second nominal spring rate to said first nominal spring height corresponding to said first nominal spring rate that is less than said second nominal spring rate;
- c) providing a controller adapted to selectively actuate at least said second actuator and installing said controller on said vehicle; and,
- d) operating said controller to selectively actuate at least said second actuator to fill or vent a volume of air from said air spring assembly to thereby at least partially adjust said suspension system into one of a first performance mode in which said damping member has a first damping rate within a first damping rate range and said air spring assembly has said first nominal spring rate and said first nominal spring height, a second performance mode in which said damping member has a second damping rate within a second damping rate range and said air spring assembly has a said second nominal spring rate and said second nominal spring height, and a third performance mode in which said damping member has a third damping rate within a third damping rate range and said air spring assembly has said third nominal spring rate and said third nominal spring height.

21. A method according to claim 20 further comprising:
providing a control panel in communication with said controller, said control panel being operative to receive a user-inputted selection corresponding to one of said first, second and third performance modes and operative to generate an input signal corresponding to said user-inputted selection; and,
generating an input signal corresponding to said user-inputted selection and communicating said input signal to said controller such that said selective actuation in d) is at least partially based on said input signal.

22. A method according to claim 20, wherein providing said first actuator in a) includes providing a first actuator that is manually-adjustable, and adjusting said suspension system in d) includes manually adjusting said first actuator such that said damping member has one of a first damping rate within said first damping rate range, a second damping rate within said second damping rate range and a third damping rate within said third damping rate range corresponding to a respective one of said first, second and third performance modes.

* * * * *